United States Patent [19]
Chapman

[11] Patent Number: 5,820,324
[45] Date of Patent: Oct. 13, 1998

[54] MASTER INTERLOCKING NAIL SYSTEM

[76] Inventor: Samuel Chapman, 1515 W. Rick Ct., Port Huron, Mich. 48060

[21] Appl. No.: 859,397

[22] Filed: May 20, 1997

[51] Int. Cl.$^6$ .................................................... F16B 15/00
[52] U.S. Cl. ........................................... 411/358; 411/448
[58] Field of Search .................................... 411/357, 358, 411/359, 447, 448

[56] References Cited

U.S. PATENT DOCUMENTS

| | | |
|---|---|---|
| 669,077 | 3/1901 | Duboraw . |
| 867,429 | 10/1907 | Simmerman .............................. 411/358 |
| 1,075,911 | 10/1913 | Gobin . |
| 1,428,111 | 9/1922 | Molesworth .............................. 411/359 |
| 3,865,307 | 2/1975 | Schiro .................................. 411/358 X |
| 4,456,416 | 6/1984 | Schlein . |
| 4,611,964 | 8/1986 | Schlein . |

FOREIGN PATENT DOCUMENTS 915366  11/1946  France ..................................... 411/358

Primary Examiner—Neill R. Wilson
Attorney, Agent, or Firm—Terrance L. Siemens

[57] ABSTRACT

The invention features an improved flush installation multi-part interlocking nail fastening system which eliminates loosening of flooring members, rubbing, or relative movement, thereby eliminating squeaks and noises. A master nail with modified head and shank portions accepts insertion of two smaller nails of soft composition which, when driven into a pair of internal longitudinal bores, these small nails exit the master nail to form opposing arcs, pulling abutting floor members into tight abutting engagement.

3 Claims, 2 Drawing Sheets

MASTER INTERLOCKING NAIL SYSTEM

BACKGROUND OF THE INVENTION

1. Field of the Invention

The present invention relates to a locking anchor flooring nail, and more particularly to a master interlocking nail system. The invention is useful in manufacturing and construction of homes, boats, or in any environment where the secure fastening of flush abutting wooden boards or suitable composition material is desired.

2. Description of the Prior Art

A common problem of most homeowners is squeaking floors. This problem usually occurs a while after construction, and is a result of conventional nails pulling loose from the floor joist which serves as the undersupport to which the flooring is secured.

In an attempt to overcome this problem, many builders have resorted to laying down an adhesive material on the top surface of the floor joists prior to laying the floor sheeting thereover. This procedure is messy, and has only a temporary effect on the problem. Over a period of time the adhesive tends to dry out, and with additional walking thereover, the adhesive breaks loose and the squeaking problem presents itself again.

Anchor nail fasteners have been utilized for various applications as exemplified in the following United States patents.

U.S. Pat. No. 4,456,416, issued to Seymour N. Schlein on Jun. 26, 1984, describes an anchor nail fastener which utilizes a single nail inserted into a guide tube which is used to provide proper nail exit. By contrast, the master interlocking nail system employs a first and a second soft nail driven through a primary spike.

U.S. Pat. No. 4,611,964, issued to Seymour N. Schlein on Sep. 16, 1986, shows an anchor nail fastener which accepts the insertion of a singular nail insert, and is intended primarily to prevent the phenomenon of nail pop-back or a dimple formation caused by the loosening of the anchor. By contrast, the master interlocking nail system uses a three part nail which is primarily installed in a preformed counterbore.

U.S. Pat. No. 1,075,911, issued to A. F. Gobin on Oct. 14, 1913, shows a railroad spike which uses a single staple or nail to eliminate the upward movement of the spike. In contrast, the master interlocking nail system is a three part fastener used to stop relative movement of abutting members of the same plane.

U.S. Pat. No. 669,077, issued to C. L. Durboraw on Mar. 5, 1901, shows a railroad spike which is designed to resist upward forces while securing differing members. By contrast, the present invention is a separate device which is designed to fasten abutting floor boards of the same plane in a fixed position, inhibiting relative movement or rubbing.

None of the above inventions and patents, taken either singly or in combination, is seen to describe the instant invention as claimed.

SUMMARY OF THE INVENTION

Some of the prior mentioned patents have attempted to solve the "squeaking floor" problem noted above. It has been concluded that the main factor which contributes to this squeaking problem is one of relative movement between board members. More specifically, it is the resulting action of abutting board edges where two sheets of flooring material (usually plywood) move relative to each other.

The invention primarily applies to two abutting board members where there is potential relative movement. A master interlocking nail has been developed in an effort to overcome this problem. Briefly stated, the master interlocking nail system is a spike (master nail) with modified head and shank portions, and a first and second small nail. The head portion includes a pair of separated bores which extend downwardly through the shank of the spike. The lowermost end of each independent bore includes an arcuate extending portion adjacent to the exit aperture. These bores receive small nails which are driven into the bores after the primary nail has been driven into the floor joist. Due to the curvature of the bores, the secondary small nails exit opposite sides of the primary spike shank in such a manner so as to not only secure abutted boards in a downward direction, but also to prohibit the rubbing of board member edges. Thus it can be seen that the secondary nails which have exited the primary spike's master nail shank on opposite sides, and a pair of anchors, are provided to prevent relative movement of abutting floor members, thus eliminating the squeaking problem.

Accordingly, an object of the invention is to provide an improved fastener system, and more particularly to provide improvements with a quickly connected three part fastener of interlocking nail type.

A further object of the invention is to provide a three part fastener comprised of a primary spike and a first and second small nail, which cooperate to lock abutting floor members to prevent relative movement and eliminate any squeaking noise generation.

Yet another object of the invention is to provide a three part fastener installed in a counterbore which is preformed in abutting flooring members and cooperates to effectively anchor board members.

A still further object of the invention is to provide an interlocking three part nail system which is useful in eliminating squeaking problems in two and three board environments.

It is an object of the invention to provide improved elements and arrangements thereof in an apparatus for the purposes described, which is easy to use, dependable and fully effective in accomplishing its intended purpose.

Yet another object of the instant invention is to provide a three part interlocking fastener which uses multiple interchangeable small nail inserts of different lengths.

These and other objects of this instant invention will become more apparent hereinafter. The instant invention will now be discussed with particular reference to the accompanying drawings which form a part of this specification wherein like reference characters designate the corresponding parts in the several views.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
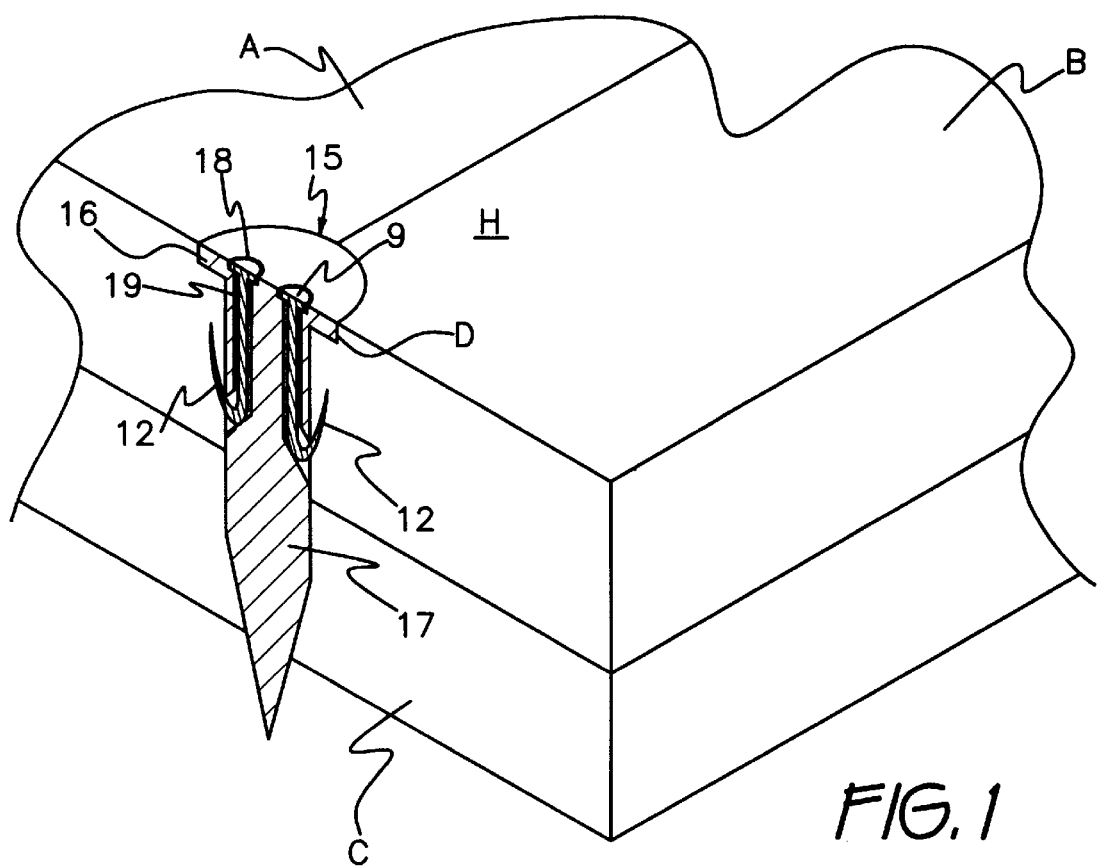
FIG. 1 is an environmental cross-sectional view of the novel master interlocking nail system with the first and second smaller nails driven into position.

Turning now to FIG. 1 of the drawings which shows an environmental view of the master interlocking nail system 15 seated in a preformed counterbore D, and driven into subflooring C. Small nails 12 are driven downwardly into internal longitudinal bores 19 until seated in counterbore 18, accepting the small nail head 9 to provide a flush smooth surface with plane H. Although small nails 12 shown are of a soft metal composition, other materials such as Teflon or plastic may be used. Small nails 12 exit master nail shank 17 in opposing arcs, with a first small nail and a second small nail penetrating the opposing abutted floor members A and B, thus eliminating relative movement between abutted board members. The master interlocking nail system 15 shown is suitable for the installation of various composition construction materials.

Figure 2:
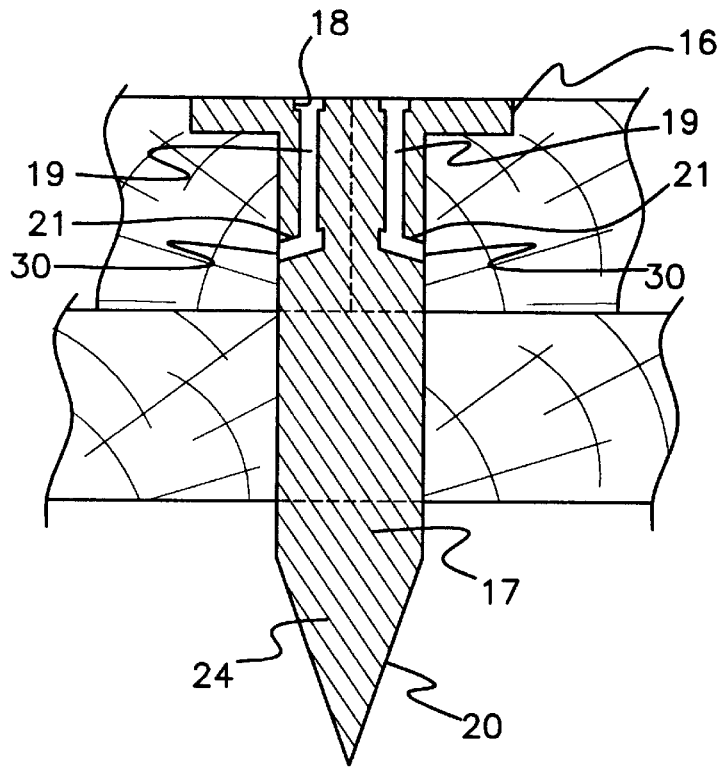
FIG. 2 is a cross-sectional view of the master nail, showing the two channels therein for guiding the two smaller nails.

FIG. 2 shows longitudinal bores 19 of master nail 24, each having a radial bore 21 used to form the small nails in opposing arcuate shapes prior to exiting the master nail shank 17 through the small nail exit apertures 30. The number and placement of these longitudinal bores may be changed as desired. The master nail 24, as shown, is of a hard metal composition although other materials are suitable.

Figure 3:
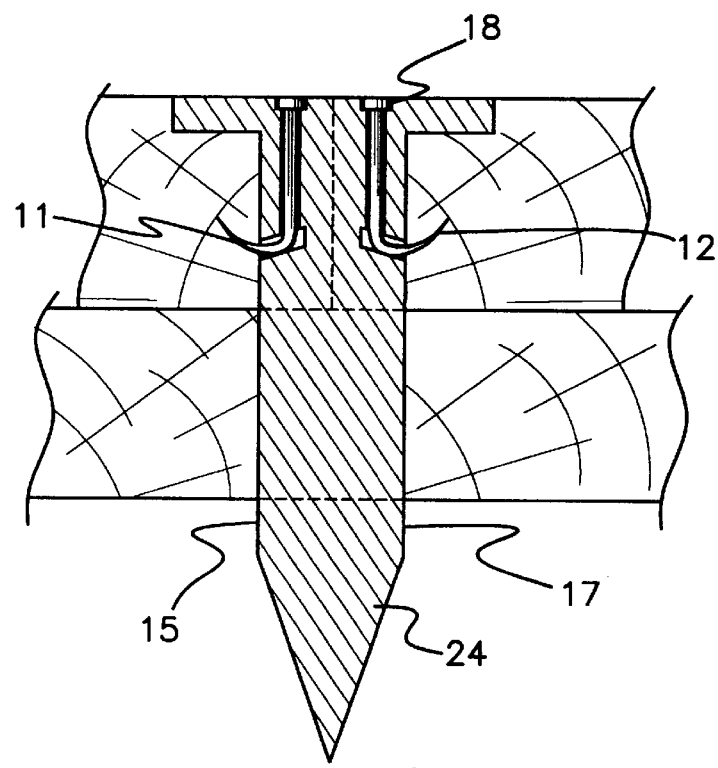
FIG. 3 is a cross-sectional view of the spike, showing the two channels for shaping the secondary nails.

FIG. 3 demonstrates the master interlocking nail system 15 with a long small nail 11 and a short small nail 12 exiting the master nail shank 17 by means of small nail exit apertures 30 in opposing arcs of differing lengths. This configuration is used primarily in construction applications adjacent to an outer wall or surface, preventing small nail exposure while providing tight engagement of floor members.

It is to be understood that the present invention is not limited to the embodiments described above, but encompasses any and all embodiments within the scope of the following claims.

I claim:

1. An apparatus for securing abutting flooring members where said abutting floor members include a plurality of spaced, cooperating countersunk depressions along their edges comprising:

master nail portion having a head and a round sharpened shank, said head of said master nail portion being adapted to fit flush into one of said cooperating countersunk depressions, and where said cooperating countersunk depressions extend equally into both of the abutting flooring members;

a pair of bores extending in a side by side relationship through said head and into said sharpened shank of said master nail portion, where each of said bores has a first, longitudinal section having a counterbored opening in said head and a second, radial section, each said radial section ending at an opening in the side of said round sharpened shank diametrically opposed to the other said opening of said radial section of the corresponding said bore; and first and second small nails, both said first and second small nails being sized such that they each can be driven into one of said pair of bores, said first and second small nails being configured to fit into said counterbored opening on said head to fit flush with said head; whereby said master nail portion is driven into one of said cooperating countersunk depressions and when said first and second smaller nails are driven into said pair of bores, said radial sections of said bores force said first small nail into one of said abutting flooring members and said second small nail into the other of said abutting flooring member wherein said countersunk depressions cooperating with said head and said counterbored openings of said bores cooperating with said first and said second small nails create a smooth floor surface when assembled.

2. The apparatus according to claim 1, wherein the depth of said cooperating depressions is substantially equal to the vertical thickness of said head so as to provide a smooth flooring surface when assembled.

3. The apparatus according to claim 1, wherein said first longitudinal section and said second radial section of each said bore are straight and linear and intersect at an obtuse angle.

\* \* \* \* \*